US006872279B1

(12) United States Patent
Kolowrot et al.

(10) Patent No.: US 6,872,279 B1
(45) Date of Patent: Mar. 29, 2005

(54) SPRAYABLE HOTMELT ADHESIVE, METHOD OF MAKING, AND METHOD OF USING

(75) Inventors: Dirk Kolowrot, Krefeld (DE); Heinrich Traeger, Meerbusch (DE)

(73) Assignee: Henkel Kommanditgesellschaft Auf Aktien (Henkel KGAA), Duesseldorf (DE)

( * ) Notice: Subject to any disclaimer, the term of this patent is extended or adjusted under 35 U.S.C. 154(b) by 0 days.

(21) Appl. No.: 09/787,248

(22) PCT Filed: Sep. 14, 1999

(86) PCT No.: PCT/EP99/06799

§ 371 (c)(1),
(2), (4) Date: Aug. 24, 2001

(87) PCT Pub. No.: WO00/17286

PCT Pub. Date: Mar. 30, 2000

(30) Foreign Application Priority Data

Sep. 21, 1998 (DE) .......................................... 198 43 141

(51) Int. Cl.$^7$ ................................................. C09J 11/02
(52) U.S. Cl. ..................................... 156/334; 524/491
(58) Field of Search ........................... 524/491; 156/334

(56) References Cited

U.S. PATENT DOCUMENTS

| 3,541,188 A | 11/1970 | Srail ........................... 156/334 |
| 4,210,570 A | 7/1980 | Trotter et al. |
| 5,021,257 A | 6/1991 | Foster et al. |
| 5,149,741 A | 9/1992 | Alper et al. ................. 156/334 |
| 5,241,014 A | * 8/1993 | Kehr et al. .................. 525/376 |
| 5,723,546 A | * 3/1998 | Sustic ......................... 525/240 |
| 5,741,840 A | 4/1998 | Lindquist et al. ............ 524/491 |
| 5,763,333 A | * 6/1998 | Suzuki et al. ................ 442/351 |
| 5,804,519 A | * 9/1998 | Riswick et al. .............. 442/392 |
| 2001/0031670 A1 | * 10/2001 | Iwami et al. ................ 473/371 |

FOREIGN PATENT DOCUMENTS

| DE | 40 00 695 A1 | 7/1991 |
| EP | 0 442 045 A2 | 8/1991 |
| EP | 0 211 311 B1 | 5/1993 |
| EP | 0 442 045 B1 | 10/1993 |
| WO | WO 97/15636 | 5/1997 |
| WO | WO 97/33921 | * 9/1997 |

OTHER PUBLICATIONS

Vestoplast™ data sheet from internet.*
REXtac™ data sheet from internet.*
Genicel® Asphalt modifiers.*
printout from Internet of properties of Paraffinic Shellflex Oils.*
"Vestoplast: Klebrohstoff für Hot–Melt–Anwendungen," Techn. Information Vestoplast, Hüls AG, pp. 1–35, (Jan. 1996).

"Standard Test Method of Apparent Viscosity of Hot Melt Adhesives Coating Materials," (ASTM D 3236–88), American Society for Testing and Materials, pp. 1–8, (Mar. 1999).
"Testing of Plastics and Elastomeres; Thermal Analysis; DSC–method," (DIN 53 765), DIN Deutsches Institute für Normung e.V., pp. 1–12, Berlin, (Mar. 1994).
Viscometry: Measurement of Kinematic Viscosity by Means of the Ubbelohde Vascometer, Standard Type, (DIN 51 562 Teil 1), DIN Deutsches Institute für Normung e.V., pp. 1–4, Berlin, (Jan. 1983).
"Viscometry: Measurement of Kinematic Viscosity by Means of the Ubbelohde Viscometer; Micro Ubbelohde Viscometer," (DIN 51 562 Teil 2), DIN Deutsches Institute für Normung e.V., pp. 1–3, Berlin, (Dec. 1998).
"Viscometry: Measurement of Kinematic Viscosity by Means of the Ubbelohde viscometer; Viscosity Relative Increment at Short Flow Times," (51 562 Teil 3), DIN Deutsches Institute für Normung e.V., pp. 1–5, Berlin, (May 1985).
"Standard Test Methods for Softening Point of Resins Derived from Naval Stores by Ring–and–Ball Apparatus, "(ASTM E 28), American Society for Testing and Materials, pp. 1–6, Berlin, (Dec. 1988).
"Testing of Bitumen; Determination of Needle Penetration," (DIN 52 010), DIN Deutsches Institute für Normung e.V., pp. 1–4, Berlin, (Dec. 1983).
"Testing of Organic Materials; Test for Separating Layers of Laminated Woven Fabrics", (DIN 53 530), DIN Deutsches Institute Für Normung e.V., (Feb. 1981), pp. 1–4, Berlin, (Feb. 1981).
"Testing of Elastomers: Evaluation of Tear Propagation, Adhesion, and Peel Tests", (DIN 53 539), DIN Deutsches Institute für Normung e.V., p. 2, Berlin, (Sep. 1979).
"Viscometry; Measurement of the Dynamic Viscosity of Newtonian Fluids by Means of Rotation Viscometers; Fundamentals," (DIN 53 018 Teil 1), DIN Deutsches Institute für Normung e.V., pp. 2–5, Berlin, (Mar. 1976).
"Viscometry; Measurements of the Dynamic Viscosity of Newtonian Fluids by Means of Rotation Viscometers; Sources of Errors and Corrections Concerning Cylindrical Rotation Viscometers," (DIN 53 018 Teil 2), DIN Deutsches Institute für Normung e.V., pp. 2–9, Berlin, (Mar. 1976).
"Testing of Plastics and Elastomers; Determination of Density", (DIN 53 479), DIN Deutsches Institute für Normung e.V., pp. 2–4, Berlin, (Jul. 1976).

* cited by examiner

Primary Examiner—Blaine Copenheaver
Assistant Examiner—Barbara J Musser
(74) Attorney, Agent, or Firm—Woodcock Washburn LLP

(57) ABSTRACT

The present invention relates to a sprayable hotmelt adhesive composition, a process for preparing the same, and a method of using the same. The hot melt adhesive composition contains 30 weight percent to 70 percent of one or more poly-α-olefins; 5 weight percent to 30 weight percent of at least one oil; and 20 weight percent to 60 weight percent of at least one hydrocarbon resin having a softening range of 70° C. to 140° C. The poly-α-olefin or the mixture of poly-α-olefins has a softening point of 70° C. to 30° C. and a melt viscosity at 190° C. of 1,000 mPas to 20,000 mPas. The hotmelt adhesive has a viscosity at 150° C. of 500 mPas to 4,000 mPas.

20 Claims, No Drawings

SPRAYABLE HOTMELT ADHESIVE, METHOD OF MAKING, AND METHOD OF USING

CROSS REFERENCE TO RELATED APPLICATIONS

This application is a national stage application under 35 U.S.C. § 371 of international application PCT/EP99/06799 filed on Sep. 14, 1999, the international application not being published in English. This application also claims priority under 35 U.S.C. §119 to DE 198 43 141.4, filed on Sep. 21, 1998.

FIELD OF THE INVENTION

This invention relates to a sprayable hotmelt adhesive based on a substantially amorphous poly-α-olefin (APAO) with a softening point (ring-and-ball method) of 70 to 130° C., a melt viscosity at 190° C. of 1,000 to 20,000 mPas and an addition of resins and oils. The present invention also relates to the production of this hotmelt adhesive and to its use.

BACKGROUND OF THE INVENTION

A sprayable hotmelt adhesive is already known. Thus, EP 0 442 045 B1 describes a sprayable hotmelt adhesive based on the above-mentioned poly-α-olefin with no more than 30% by weight of additives, more especially waxes and/or resins. Paraffinic or aromatic oils may also be used. The Examples contain ethene/propene/1-butene terpolymers and plastic microwaxes and, in some cases, even a hydrocarbon resin. The viscosities are in the range from 2,700 to 3,400 mPas at 190° C.

The Hüls technical information pamphlet entitled "Vestoplast: Klebrohstoff für Hot-Melt-Anwendungen (Vestoplast: an Adhesive Raw Material for Hotmelt Applications)" dating back to 1996 describes a number of atactic poly-α-olefin copolymers and terpolymers of the monomers ethylene; propylene and 1-butene. Polymers such these have excellent wetting behaviour on nonpolar substrates such as, for example, polyethylene and polypropylene. An increase in adhesive strength can be achieved by combination with tackifying resins or plasticizers. Recommended resins include, in particular, substantially saturated hydrocarbon resins. Added in a quantity of up to 30%, the resin acts as a plasticizer. Beyond 35%, the mixture assumes the properties of the resin and becomes hard and brittle. The tensile strength of a mixture of poly-α-olefin and resin in a ratio of 70:30 parts by weight falls by at least 20% when the ratio is changed to 50:50 parts by weight at the expense of the poly-α-olefin. Waxes are added inter alia for fine viscosity adjustment and to reduce stringing. In most cases, polybutenes of relatively low molecular weight are recommended as plasticizers. It costs less to use paraffinic or naphthenic mineral oils. The basic formulation for sprayable hotmelt adhesives for sanitary articles contains 70 parts of Vestoplast 704 (a poly-α-olefin), 25 parts of Escorez 5380 (a hydrogenated polycyclopentadiene), 5 parts of Napvis D 10 (a polybutene liquid at room temperature) and 0.4 part of Irganox 1010 (an antioxidant for polyolefins). This known sprayable hotmelt adhesive has a melt viscosity of 2,000 mPas at 190° C. and a softening point of 91° C. Unfortunately, it has poor adhesive properties. Thus, the initial adhesion values in particular are poor and deteriorate even further in the event of storage. Further disadvantages include a distinct reduction in the adhesion values in the wet state, the so-called "wet values" or "wet strength". Since the adhesives described in the document in question are used in particular for the production of a composite material, for example for a composite material containing at least one nonwoven, it is essential that the adhesion values after storage and the wet adhesion values do not fall below the initial values. The adhesives are being used to an increasing extent in many areas of everyday life because, in general, they represent a simple, permanent and safe method of fixing materials. Composite materials of the type used in particular in the field of personal hygiene are generally materials with a limited useful life which are discarded, for example, after being used only once, more especially disposable products. Products such as these mainly include diapers, sanitary towels and panty liners etc. of which the function is to absorb bodily fluids such as, for example, urine and blood. In view of this fact, the adhesive used in the composite material must hold the material together even in the "wet" state. This is only possible if the so-called wet values are at the same level as the initial values.

EP 211 311 describes a self-adhesive absorbent shaped, body and a process for the production of a pressure-sensitive hotmelt adhesive suitable therefor. The pressure-sensitive hotmelt adhesive consists of 20 to 80% of substantially amorphous olefinic polymers, 20 to 80% of tackifying resins and 0 to 80% of plasticizer oil, the polymers being atactic and the pressure-sensitive hotmelt adhesive having a shear strength of less than 1 minutes (standard test against steel). Only one olefinic polymer is mentioned. It has a melt viscosity at 190° C. of ca. 50,000 mPas.

Accordingly, the problem addressed by the present invention was to improve adhesion, above all initial adhesion, but also adhesion after storage for a certain period and also wet adhesion. In addition, however, the adhesion levels would be made more independent of the processing conditions, more especially the spraying temperature, the quantity applied and the method of application. However, the spraying properties and other important processing and performance properties would not be adversely affected.

SUMMARY OF THE INVENTION

The solution provided by the invention is defined in the claims and consists essentially in the composition of sprayable hotmelt adhesive, namely, A) 30 to 70% by weight and preferably 35 to 50% by weight of at least one substantially amorphous poly-α-olefin or poly-α-olefin mixture with a softening point (ring-and-ball method) of 70 to 130° C., a melt viscosity at 190° C. of 1,000 to 20,000 mPas and preferably with a density of <0.90 g/cm3, a needle penetration of 0.8 to 4.0 mm, a molecular weight as determined by gel permeation chromatography of at most 100,000 (weight average) or at least 4,000 (number average), the difference between the weight average and the number average molecular weight being no more than six times the number average, B) 5 to 30% by weight and more particularly 15 to 25% by weight of at least one oil of a saturated hydrocarbon of relatively low vapor pressure which is liquid at 20° C., more especially at least one mineral oil with a paraffinic or naphthenic base and, above all, at least one medicinal white oil, C) 20 to 60% by weight and more particularly 25 to 50% by weight of at least one hydrocarbon resin with a softening range of 70 to 140° C. and, more particularly, 8o to 120° C., suitable hydrocarbon resins being above all resins containing 5 to 9 carbon atoms and including partly or completely hydrogenated, aliphatic and aromatic hydrocarbon resins, polyterpene resins and modified polyterpene resins and also natural resins, and D) optionally additives, such as heat and light stabilizers, optical brighteners, antistatic agents, lubricants and antiblocking agents, nucleating agents, dyes, pigments and flame retardants, with a viscosity of 500 to 4,000 MPas and, more particularly, in the range of 700 to 1,900 mPas, as measured in accordance with ASTM D 3236-88 (Brookfield Model RVT DVII, 150° C., spindle 27).

DETAILED DESCRIPTION OF THE INVENTION

The poly-α-olefins (component A) are polymers of the type described in EP 0 442 045 B1 of which the disclosure is hereby specifically included as part of the present application.

Preferred polyolefins are either completely amorphous or have only minimal crystallinity. Accordingly, the heat of fusion for heating to 180° C. (ΔH) by DTA analysis in accordance with DIN 53765 should only be between 330 and 500 J/g and, more particularly, between 370 and 450 J/g while the specific heat capacity from 20 to 200° C. by DTA analysis in accordance with DIN 53765 should be between 1.0 and 4.0 $\mu$g·K and, more particularly, between 1.7 and 3.2 J/g·K. The glass transition temperature Tg, which is also to be determined by DTA analysis in accordance with DIN 53765, should be in the range from −15° C. to 400° C. and, more particularly, in the range from −200° C. to −38° C. Suitable products may be produced, for example, by radical degradation of commercially available substantially amorphous poly-α-olefins with softening points of 80 to 140° C. and viscosities of 5,000 to 100,000 mPas at 190° C. This method of production is the subject of German patent application P 40 00 695.6. However, they may also be produced by any other process providing they then have the claimed features.

Suitable substantially amorphous poly-α-olefins may carry functional groups to improve adhesion to standard substrates. These functional groups may be introduced either by copolymerization with small quantities of functional monomers or, preferably, by radical reaction of commercially available poly-α-olefins with such functional monomers. Suitable monomers are, for example, maleic anhydride, fumaric acid, acrylic and methacrylic acid, itaconic acid, aconitic acid and derivatives thereof such as, for example, esters or amides and vinyl trimethoxysilane (VTMO) and 3-methacryloxypropyl trimethoxysilane (MEMO; $H_2C=C(CH_3)COO(CH_2)_3Si—(OCH_3)_3$). They are normally used in quantities of 0.1 to 10% by weight and preferably in quantities of 0.5 to 5% by weight, based on the poly-α-olefin. Standard radical initiators such as, for example, dicumyl peroxide or 2,2'-azo-bis-(2-acetoxypropane) are used in quantities of 0.05 to 3% by weight and preferably 0.1 to 2% by weight. The grafting reaction then takes place at elevated temperatures, generally in the range from 100 to 300° C. Polymers with high cohesion and improved adhesion to certain substrates, such as metal, plastic or glass surfaces, are obtained in this way.

In one preferred embodiment, the substantially amorphous poly-α-olefin is a binary or tertiary copolymer of olefins containing 2 to 10 carbon atoms. This copolymer preferably has the following monomer composition: 3 to 75% by weight of an α-olefin containing 4 to 10 carbon atoms, 25 to 95% by weight of propene and 0 to 20% by weight of ethane.

In addition, the copolymer may also contain functional monomers, as already mentioned. In one particularly preferred embodiment, 1-butene is used as the α-olefin containing 4 to 10 carbon atoms. Mixtures of different poly-α-olefins according to the invention may of course also be used.

The poly-α-olefin mixture preferably contains at least one poly-α-olefin with a melt viscosity of 40,000 to 60,000 and at least one poly-α-olefin with a melt viscosity of 3,000 to 10,000 mPas at 190° C.

The melt viscosity of the poly-α-olefin or the poly-α-olefin mixture is advantageously in the range from 2,000 to 15,000 mPas at 190° C.

Poly-α-olefins such as these commercially available under such names as Vestoplast®, Rexene®, etc.

Component B comprises oils of substantially saturated hydrocarbons of relatively low vapor pressure which are liquid and, in particular, thinly liquid (20 to 300 mPas) at 20° C., more especially mineral oils with either a paraffinic base or a naphthenic base and, above all, medicinal white oils which are approved for use in foods under FDA 175 105. These white oils have a viscosity of 25 to 230 mPas and, more particularly, in the range from 110 to 230 mPas, as measured in accordance with DIN 51562 at 20° C. These oils are used inter alia for fine viscosity adjustment. They are commercially available under such names as Primol352®, Essomarcol® oils, Pionier 0352®, Drakeol 35®, Kaydol®, Ondina G® oils, Catenex N® oils, etc.

Component C contains above all a hydrocarbon resin of $C_{5-9}$ structural units, more particularly a substantially and, more particularly, completely hydrogenated polycyclopentadiene resin as the hydrocarbon resin. Specific examples are MBG® resins, Regalite R and S® resins, Zonarez® resins, Zonatac® resins, Betaprene® AC, AF, AK, AR, B, BC, BR resins, Betalite® resins, Eastotac® resins, ECR® resins, Escorez® resins, Wingtack® resins, etc.

Components B and C together should make up at least 30% by weight, preferably at least 35% by weight and more preferably at least 45% by weight, based on the sum of components A, B and C. In other words, the poly-α-olefin content should be at most 70%, more particularly at most 65% and above all at most 55% by weight, based on components A, B and C.

In order to obtain a particularly uniform spray pattern, even at relatively low melting temperatures of, for example, 130° C., components A, B and C should be selected within the claimed range so that the melt viscosity at 100° C. is in the range from 5 to 15 Pas±15, more particularly ±10%, depending on the shear rate between 0 and 250 sec$^{-1}$. Even at 130° C., it shows non-newtonian flow behaviour. The measurements were carried out to DIN 53018-1.

The hotmelt adhesives according to the invention are preferably non-pressure-sensitive hotmelt adhesives. Besides the percentage contents of components A, B and C, the choice of the nature of the components is very important. Thus, the melt viscosity of the poly-α-olefin or the poly-α-olefin mixture should be between 2 and 15 Pas at 190° C. (Brookfield).

Besides these essential components, other substances, for example heat and light stabilizers, optical brighteners, antistatic agents, lubricants and antiblocking agents, nucleating agents and dyes, pigments and flame retardants, may also be added.

A suitable antioxidant is, above all, Irganox 1010 used in a quantity of 0 to 3% by weight, based on the hotmelt adhesive as a whole. Other suitable stabilizers are, above all, Irganox PS 800, Irgastab DBTM, Tinuvin P, Wingstay stabilizers, Wingstay SN-1, Evemox 10, etc.

Fully synthetic thermoplastic polymers, especially polypropylene, may also be added, for example to modify the softening temperature. Suitable polypropylene types include atactic polypropylene, homopolypropylene, statistical copolymers, block copolymers and graft copolymers of propylene. However, other synthetic polymers may also be used, including for example ethylenetvinyl acetate copolymers, ethylene/acrylic acid copolymers, polyisobutene, polybutene, isotactic poly-1-butene, styrene block copolymers and rubber. They make up from 0 to 50% by weight and preferably from 15 to 45% by weight of the hotmelt adhesive as a whole.

To produce the hotmelt adhesive, the raw materials mentioned above are mixed in the melt in an inert gas atmosphere and/or in a vacuum until they are homogeneous. The temperature of the melt is preferably from 150 to 200° C. It is important to ensure that there are no specks in the hotmelt adhesive produced.

The hotmelt adhesive obtained is largely characterized by its viscosity of 500 to 4,000 mPas and preferably 700 to 1,900 mPas at 150° C., as measured to ASTM D 3236-88 (Brookfield Model RVT DVII; 150° C.; spindle 27). It is also characterized by its favorable sprayability both in regard to "atomization" of the melt and in regard to so-called "spin spraying". In the first of these two processes, the melt is atomized into fine melt droplets whereas, in "spin spraying", a melt strand leaves the spray nozzle in a spiral and, without breaking, is deposited in a spiral pattern onto the substrate to the coated. This spraying technology generally allows contactless application and the coating of uneven irregular surfaces. It is also suitable for applications where, although bonding over a certain area may be required, the bonded area must be permeable to air or moisture. The fact that the adhesive is not applied over the entire area means that material can be saved.

Another advantage arises in the coating of heat-sensitive substrates. By virtue of the contactless application and the very low heat content of the melt or melt strand applied, the substrate undergoes less stressing or damage than is the case in conventional methods of application. Hotmelt spraying technology is environmentally friendly and, overall, covers many applications which, hitherto, have been the preserve of sprayed solvent-based adhesives.

The favourable sprayability naturally applies both to the "atomization" mentioned earlier on and to "spin spraying". A uniform spray pattern produced by spin spraying requires a viscosity of the adhesive to be sprayed which is largely independent of the shear rate at the particular application temperature. If this were not the case, it would not be possible to achieve a constant spraying width, for example in intermittent spraying. Both at the beginning and at the end of the particular spraying cycle, the viscosity would be increased on account of the lower shear rate so that the spray pattern would change.

The spraying behavior is distinguished in particular by the following properties:
a) Temperature variations between 140 and 160° C. affect the adhesion values to an extent of only ±14%, based on a coating weight of 4 g/m$^2$.
b) Variations in the coating weight of 2 to 4 g/m$^2$ affect the adhesion values to an extent of only ±7%.
c) Such methods of application as "Control Coat" or spin spraying also have only a slight effect (namely ±6%) on the adhesion values.

Other positive properties of the hotmelt adhesive according to the invention include not only its high early adhesion, but also the increase in the adhesion values after ageing. They are in the range from 20 to 60%. Other positive properties of the adhesives according to the invention include the increase in wet strength by 29% to 126% and fiber failure of the composite material after ageing both in regard to wet strength and in regard to early adhesion.

The hotmelt adhesives according to the invention are suitable for bonding various materials. Thus, such materials as polyolefin films, for example polyethylene films or polypropylene films, polyolefin nonwovens, for example polyethylene nonwovens or polypropylene nonwovens, polyurethane films, polyurethane foams, films or mouldings of cellulose derivatives, for example tissues, films or moldings of polyacrylates or polymethacrylates, films or mouldings of polyesters, can be bonded to one another. The hotmelt adhesives according to the invention may be used to bond materials of the same kind and materials of different kinds to one another.

In one preferred embodiment of the process according to the invention, the adhesive is used in the production of a composite material containing at least one nonwoven layer. In a particularly preferred embodiment, the nonwoven layer is a polypropylene spunbonded with a weight per unit area of about 10 to about 30 g/m$^2$ and, more particularly, about 15 to about 20 g/m$^2$.

A nonwoven layer, preferably one containing or consisting of a polyolefin, is particularly suitable as the second material to be bonded to the substrate.

In the context of the present invention, a "nonwoven layer" is understood to be a flexible material which is not produced by conventional warp/weft weaving or by loop formation, but rather by the interlocking and/or cohesive and/or adhesive bonding of textile fibers. Accordingly, nonwovens are understood to be loose materials of spun fibers or filaments, generally of polypropylene, polyester or viscose, which are generally held together by the adhesion inherent in the fibers. The individual fibers may have a preferential orientation (oriented or cross-laid nonwovens) or no orientation (random laid nonwovens). The nonwovens may be mechanically strengthened by needle punching, stitching or lacing by sharp jets of water (so-called spunlaced nonwovens). Adhesively strengthened nonwovens are formed by bonding the fibers with liquid binders (for example acrylate polymers, SBR/NBR, polyvinyl ester or polyurethane dispersions) or by melting or dissolving so-called binding fibers which have been added to the nonwoven during its production. In the case of cohesive strengthening, the fiber surfaces are dissolved by suitable chemicals and joined by pressure or welded at elevated temperature. Nonwovens of so-called spunbondeds, i.e. materials produced by spinning and subsequent deposition, blowing or floating on a conveyor belt, are known as spunbonded nonwovens. Nonwovens containing additional filaments, woven or knitted fabrics count as reinforced or strengthened nonwovens.

In one preferred embodiment of the process according to the invention, the adhesive is used for the production of a composite material containing at least one nonwoven layer, above all for bonding films, more particularly of polyolefins, and nonwovens, more particularly of polypropylene, the application temperature being between 120 and 180° C. and preferably between 140 and 160° C., the coating weight varying between 2 and 10 and preferably between 3 and 4 g/m$^2$ and the application rate preferably being between 50 and 400 m/min. In a particularly preferred embodiment, the nonwoven layer is a polypropylene spunbonded with a weight per unit area of about 10 to about 30 g/m² and, more particularly, in the range from about 15 to about 20 g/m².

By virtue of these positive properties, the hotmelt adhesives according to the invention are suitable for structural bonding in sanitary products, more especially for bonding diapers and sanitary napkins.

Further applications are in the packaging industry, the automotive supply industry, the building industry, etc.

The invention is illustrated by the following Examples.

I Starting Materials for the Production of the Hotmelt Adhesives

1. Poly-α-olefins: Vestoplast 508, 704 and 750 (terpolymers of ethylene, propylene and butylene) of Hüls AG
2. Oils: Primol 352, a medicinal white oil manufactured by Esso
3. Resins. MGB-278 and Regalite R-R91 (cyclopentadiene resins) of Hercules
4. Antioxidants: Irganox 1010 of Ciba Geigy.

II Production and Properties of the Hotmelt Adhesives

To produce the hotmelt adhesives, the starting materials mentioned above are melted at 160 to 170° C. in the quantities shown in Table 1a) in the following order: oil+ antioxidant, resin and poly-α-olefin, and stirred at 160 to 170° C. until the mixture is speck-free (homogeneous). This generally takes 2 to 4 hours. It is also advisable to apply a vacuum and/or an inert gas atmosphere (nitrogen).

The hotmelt adhesives obtained have the properties set out in Table 1b).

III Adhesive Testing of the Hotmelt Adhesives

1. The spraying tests were carried out with a Meltex CT 325 sprayer (manufacturer: Meltex, Luineburg). The spray heads used were Nordson models CF 203 and CF 205 (the abbreviation CF stands for controlled fiberization). In the CF spray heads used here, a spiral movement is imparted to the adhesive issuing from the nozzle by compressed air. This procedure provides for the controlled, surface-covering and edge-sharp application of hotmelt adhesives.

| | |
|---|---|
| Quantity applied: | 3.0 to 4.0 g · m⁻² |
| Application rate: | 100 m · min.⁻¹ |
| Temperature in the melting tank: | 160° C. |
| Temperature of the spraying air: | 180° C. |
| Adhesive temperature: | 160° C. |

Composite materials were produced on the basis of these parameters. On the one hand, the adhesive was sprayed onto the film while the nonwoven moved in the opposite direction; on the other hand, the adhesive was sprayed onto the nonwoven while the film moved in the opposite direction. In addition to these tests carried out at an adhesive temperature of 160° C. (tests A), tests were also carried out at an adhesive temperature of 140° C. (tests B).

The film used was a 4P PE film, i.e. a polyethylene film with a thickness of about 10 to about 50 μm and, more particularly, about 20 to about 30 μm. The nonwoven used was Corosoft Plus H, a nonwoven of polypropylene with a weight per unit area of 14 to 30 g·m² and, more particularly, 17 g·m⁻². In case a), the hotmelt adhesive was sprayed onto the film which was then bonded to the nonwoven. In case b), the adhesive was sprayed onto the nonwoven which was then bonded to the film.

2. The adhesion value tests are summarized in Table 1c).

IV Results

By comparison with the reference product, the tests of Examples 1 and 2 show a distinct increase in early strength up to fiber failure irrespective of the coating weight and irrespective of the production of the composite (in other words, there was a distinct improvement in the adhesion values in the film/nonwoven composite and in the nonwoven/film composite), a distinct increase in the adhesion values with fiber failure after ageing, based on the early strength, irrespective of the production of the composite and a distinct increase in the wet adhesion values with fiber failure, based on the early strength, irrespective of the production of the composite and a distinct step-by-step reduction in the adhesion values of the reference product after ageing and in the wet test.

V Description of the Test Methods:

Melt viscosity to ASTM D 3236-88, Brookfield Model RVT DV II, 150° C., spindle 27, softening point to ASTM E 28, needle penetration (100/2515) to DIN 52010 in 0.1 mm, peel strength (so-called adhesion value) to DIN 53530 using a Zwick 1435 tensile tester at 20° C./50% relative air humidity. The 50 mm wide sample is separated at a rate of 300 mm/min. at an angle of 180°. The result is expressed in $Ncm^{-1}$. The coating of the sample was measured at the earliest after 48 h.

Ageing behavior was simulated by so-called accelerated ageing (72 h at 60° C. with a subsequent cooling time of at least 24 h).

Wet strength (the sample to be tested is placed for 1 h in a 0.9% sodium chloride solution and then tested, internal test).

Crystallinity by DTA analysis to DIN 53765.

Density to DIN 53479

Flow behavior to DIN 53018-1.

The rheological tests of the hotmelts were carried out with a TA Instruments AR 1000 rotational viscosimeter. To this end, a plate/plate geometry (4 cm diameter, 500μ interval) was used in the shear-rate-dependent flow test. The adhesive was heated for 5 minutes at the measuring temperature between the plate/plate geometry. The viscosity was then measured continuously for 5 minutes as a function of the shear rate of 0 to 250 s⁻¹ or 250 to 0 s⁻¹. In the case of samples with newtonian flow behaviour, viscosity is independent of the shear rate.

TABLE 1a

Composition of the hotmelt adhesives

| | Raw materials | | Hotmelt adhesive | | |
|---|---|---|---|---|---|
| Type | Commercial name/percentage | | Example 1 | Example 2 | Comparison |
| APAO | Vestoplast 704 | % | 22.5% | 35.0% | 70% |
| APAO | Vestoplast 508 | % | 22.5% | — | — |
| APAO | Vestoplast 750 | % | — | 5.0% | — |
| Plasticizer | Napvis D-10 | % | — | — | 5.0% |
| Oil | Primol 352 | % | 19.0% | 19.0% | — |
| Resin | MBG-278 | % | 35.0% | 20.0% | — |
| Resin | Regalite (R)-R 91 | % | — | 20.0% | — |
| Resin | Escorez 5380 | % | — | — | 25.0 |
| Antioxidant | Irganox 1010 | % | 1.0% | 1.0% | 0.4% |

TABLE 1b

Properties of the hotmelt adhesives

| Property | Example 1 | Example 2 | Comparison |
|---|---|---|---|
| Melt viscosity [mPas] at 150° C. | 1485 | 1137 | 4580 |
| Needle penetration [(100/25/5) 0.1 mm] | 42 | 89 | 17 |
| Softening point [° C.] | 79 | 76 | 96 |

TABLE 1c

Adhesion values of the film/nonwoven bonds

| Adhesion values | Example 1 A | Example 2 A | Comparison Example A | Example 1 B |
|---|---|---|---|---|
| a) Adhesive sprayed onto film | | | | |
| Coating in g m$^{-2}$ | ca. 3.6 | ca. 3.4 | 4.0 | ca. 4.0 |
| Adhesion value in N cm$^{-1}$ | 0.54 | 0.48 | 0.28 | 0.68 |
| Adhesion value in N cm$^{-1}$ after ageing | 0.84 | 0.64 | 0.20 | 0.78 |
| Wet strength N · cm$^{-1}$ | 1.22 | 0.62 | 0.12 | 0.80 |
| b) Adhesive sprayed onto nonwoven | | | | |
| Coating in g m$^{-2}$ | 3.6 | ca. 3.4 | 3.8 | ca. 3.6 |
| Adhesion value in N cm$^{-1}$ | 0.70 | 0.52 | 0.30 | 0.70 |
| Adhesion value in N cm$^{-1}$ after ageing | 0.84 | 0.63 | 0.26 | 0.62 |
| Wet strength N · cm$^{-1}$ | 1.28 | 0.62 | 0.08 | 0.54 |

What is claimed is:

1. A sprayable hotmelt adhesive comprising:
A) 35 weight percent to 50 weight percent of a mixture of poly-α-olefins having a softening point of 70° C. to 130° C., a needle penetration of 0.8 to 4.0 mm as measured in accordance with DIN 52010, and a melt viscosity at 190° C. of 1,000 mPas to 20,000 mPas; said mixture of poly-α-olefins having at least one first poly-a-olefin having a melt viscosity of 40,000 mPas to 60,000 mPas, and at least one second poly-a-olefin having a melt viscosity of 3,000 mPas to 10,000 mPas at 190° C.;
B) 5 weight percent to 60 weight percent of at least one oil having a viscosity of 20 to 300 mPas at 20° C.; and
C) 20 weight percent to 60 weight percent of at least one hydrocarbon resin having a softening range of 70° C. to 140° C.;
wherein the hotmelt adhesive has a viscosity of 500 mPas to 4,000 mPas at 150° C.

2. The hotmelt adhesive of claim 1 wherein at least one of the poly-α-olefins has a weight average molecular weight, as determined by gel permeation chromatography, of at most 100,000, or a number average molecular weight, as determined by gel permeation chromatography, of at least 4,000, wherein the difference between the weight average and the number average molecular weight is no more than six times the number average molecular weight.

3. The hotmelt adhesive of claim 1 wherein the hotmelt adhesive viscosity ranges from 700 mPas to 1,900 mPas at 150° C., as measured in accordance with ASTM D 3236-88.

4. The hotmelt adhesive of claim 1, wherein the mixture of poly-α-olefins is substantially amorphous and at least one of the poly-α-olefins comprises polymerized units of:
(i) 3 weight percent to 75 weight percent of an α-olefin containing 4 to 10 carbon atoms,
(ii) 25 weight percent to 95 weight percent of propene, and
(iii) 0 to 20 weight percent of ethene.

5. The hotmelt adhesive of claim 1, wherein the mixture of poly-α-olefins has a melt viscosity at 190° C. of 2,000 mPas to 15,000 mPas.

6. The hotmelt adhesive of claim 1, wherein at least one of the poly-α-olefins has a density of less than 0.9 g/cm3, a needle penetration of 0.8 to 4.0 mm, and a number average molecular weight, as determined by gel permeation chromatography, of at least 4,000, wherein the difference between the weight average and the number average molecular weight is no more than six times the number average molecular weight.

7. The hotmelt adhesive of claim 1, wherein the oil comprises a medicinal white oil.

8. The hotmelt adhesive of claim 1, wherein the hydrocarbon resin comprises a hydrocarbon resin having 5 to 9 carbon atoms.

9. The hotmelt adhesive of claim 1, wherein the hotmelt adhesive further comprises an additive selected from a heat or light stabilizer, an optical brightener, an antistatic agent, a lubricant or antiblocking agent, a nucleating agent, a dye, a pigment or a flame retardant, or combinations thereof.

10. The hotmelt adhesive of claim 1, wherein the combined amount of the oil and the hydrocarbon resin is at least 30 weight percent, based on the total weight of the poly-α-olefins, the oil and the hydrocarbon resin.

11. The hotmelt adhesive of claim 1, wherein the poly-α-olefins, the oil, and the hydrocarbon resin are selected so that the mixture of the poly-α-olefins, the oil, and the hydrocarbon resin has a viscosity at 100° C. ranging from 5 Pas to 15 Pas, wherein the viscosity may vary plus or minus 15% from the viscosity range and wherein the viscosity is measured at a shear rate ranging from 2 sec–1 to 250 sec–1.

12. A method of bonding sanitary products comprising (a) applying the hotmelt adhesive of claim 1 to one or more substrate materials suitable for a sanitary product and (b) contacting the substrate materials to be bonded to provide a composite sanitary product.

13. The method of claim 12, wherein at least one of the poly-α-olefins has a weight average molecular weight, as determined by gel permeation chromatography, of at most 100,000, or a number average molecular weight, as determined by gel permeation chromatography, of at least 4,000, wherein the difference between the weight average and the number average molecular weight is no more than six times the number average molecular weight.

14. The method of claim 12 wherein the sanitary product is a diaper, panty liner or a sanitary napkin.

15. A method of bonding a film and a nonwoven material comprising (a) applying to the film or nonwoven, the hotmelt adhesive of claim 1 at an application temperature ranging from 120° C. to 180° C. and at an application weight ranging from 2 g/m2 to 10 g/m2 and (b) contacting the film and nonwoven material to be bonded to provide a composite material.

16. The method of claim 15 wherein at least one of the poly-α-olefins has a weight average molecular weight, as determined by gel permeation chromatography, of at most 100,000, or a number average molecular weight, as determined by gel permeation chromatography, of at least 4,000, wherein the difference between the weight average and the number average molecular weight is no more than six times the number average molecular weight.

17. The method of claim 15 wherein the hotmelt adhesive is applied at a rate of 50 m/min to 400 m/min, the application temperature of the adhesive ranges from 140° C. to 160° C., and the application weight ranges from 3 g/m2 and 4 g/m2.

18. The method of claim 15 wherein the film is a polyolefin film.

19. A process for preparing a hotmelt adhesive comprising
A) mixing raw materials comprising
  i) 35 weight percent to 50 weight percent of a mixture of poly-α-olefins having a softening point of 70° C. to 130° C., a needle penetration of 0.8 to 4.0 mm as measured in accordance with DIN 52010, and a melt viscosity at 190° C. of 1,000 mPas to 20,000 mPas; said mixture of poly-α-olefins having at least one first poly-a-olefin having a melt viscosity of 40.000 mPas to 60,000 mPas, and at least one second poly-a-olefin having a melt viscosity of 3.000 mPas to 10,000 mPas at 190° C.;
  ii) 5 weight percent to 30 weight percent of at least one oil having a viscosity of 20 to 300 mPas at 20° C.; and
  iii) 20 weight percent to 60 weight percent of at least one hydrocarbon resin having a softening range of 70° C. to 140° C.; wherein the mixing is performed at a temperature ranging from 150 to 200° C. and in an inert gas atmosphere, or in a vacuum, or combinations thereof, and
B) forming a hotmelt adhesive having a viscosity of 500 mPas to 4,000 mPas at 150° C.

20. The process of claim 19 wherein at least one of the poly-α-olefins has a weight average molecular weight, as determined by gel permeation chromatography, of at most 100,000, or a number average molecular weight, as determined by gel permeation chromatography, of at least 4,000, wherein the difference between the weight average and the number average molecular weight is no more than six times the number average molecular weight.

* * * * *

UNITED STATES PATENT AND TRADEMARK OFFICE
CERTIFICATE OF CORRECTION

PATENT NO.         : 6,872,279 B1
APPLICATION NO.    : 09/787248
DATED              : March 29, 2005
INVENTOR(S)        : Kolowrot et al.

It is certified that error appears in the above-identified patent and that said Letters Patent is hereby corrected as shown below:

Title Page,
Item [56], References Cited, OTHER PUBLICATIONS, "(DIN 51 562 Teil 2), DIN Deutsches Institute für Normung e.V." reference, delete "(Dec. 1998)." and insert -- (Dec. 1988). --.

Item [57], ABSTRACT,
Line 4, after "70" insert -- weight --.
Line 9, delete "30° C." and insert -- 130° C. --.

Column 1,
Line 39, after "such" insert -- as --.

Column 2,
Line 27, delete "1 minutes" and insert -- 1 minute --.
Line 66, delete "8o" and insert -- 80 --.

Column 3,
Line 8, delete "MPas" and insert -- mPas --.
Line 26, delete "µg·K" and insert -- j/g·K --.
Line 29, delete "400° C." and insert -- –40° C.--.
Line 30, delete "–200° C." and insert -- –20° C.--.

Column 4,
Line 15, after "these" insert -- are --.

Column 5,
Line 3, delete "Evemox" and insert -- Evernox --.
Line 10, delete "ethylenetvinyl" and insert -- ethylene/vinyl --.

Column 7,
Line 32, delete "Luineburg)." and insert -- Lüneburg). --.
Line 59, delete "g·m$^2$" and insert -- g/m$^2$ --.

Column 8,
Line 22, delete "(100/2515)" and insert -- (100/25/5) --.

Column 9,
Lines 41 and 42, delete "poly-a-olefin" and insert -- poly-α-olefin --.

UNITED STATES PATENT AND TRADEMARK OFFICE
CERTIFICATE OF CORRECTION

PATENT NO. : 6,872,279 B1
APPLICATION NO. : 09/787248
DATED : March 29, 2005
INVENTOR(S) : Kolowrot et al.

It is certified that error appears in the above-identified patent and that said Letters Patent is hereby corrected as shown below:

Column 11,
Lines 13 and 14, delete "poly-a-olefin" and insert -- poly-α-olefin --.
Line 13, delete "40.000 mPas" and insert -- 40,000 mPas --.
Line 15, delete "3.000 mPas" and insert -- 3,000 mPas --.

Signed and Sealed this

Nineteenth Day of December, 2006

JON W. DUDAS
*Director of the United States Patent and Trademark Office*